United States Patent [19]

Coughlan

[11] 3,985,657

[45] Oct. 12, 1976

[54] FLUID FILTER CARTRIDGE
[75] Inventor: Standly T. Coughlan, Huron, Ohio
[73] Assignee: Ford Motor Company, Dearborn, Mich.
[22] Filed: July 11, 1975
[21] Appl. No.: 595,257

[52] U.S. Cl. .............................. 210/440; 210/443; 210/DIG. 17
[51] Int. Cl.² ........................................ B01D 27/02
[58] Field of Search ........... 210/460, 462, 484, 485, 210/497, 500 R, 435, 440, 441, 443, 444, 459, DIG. 13, 503, 483, 488, 489, 348, 448; 55/475, 491, 512, 516, 517

[56] References Cited
UNITED STATES PATENTS

| | | | |
|---|---|---|---|
| 1,905,919 | 4/1933 | Levis................................. | 210/460 |
| 2,181,608 | 11/1939 | Russell et al..................... | 210/440 X |
| 2,537,897 | 1/1951 | Hunter............................. | 210/489 X |
| 2,850,168 | 9/1958 | Nostrand ........................ | 210/503 X |
| 3,146,194 | 8/1964 | Hathaway ...................... | 210/443 X |
| 3,724,670 | 4/1973 | Gernhardt....................... | 210/497 X |

Primary Examiner—Frank W. Lutter
Assistant Examiner—William A. Cuchlinski, Jr.
Attorney, Agent, or Firm—John J. Roethel; Keith J. Zerschling

[57] ABSTRACT

A fluid filter cartridge having spaced inner and outer perforated walls forming concentric chambers. End plates cap the ends of the walls with one of the end plates being centrally apertured to provide a passageway in communication with the inner wall chamber. A filtering media, preferably of cotton and wood fibers, is packed in the chamber between the inner and outer walls.

The improvement comprises a plurality of surface deformations in one of the walls, preferably the outer wall, extending into the filtering media toward the other wall. The surface deformations engage and compress the filtering media contiguous thereto to provide filter flow paths from the one wall to the other of a higher density than that of the uncompressed filtering media.

11 Claims, 5 Drawing Figures

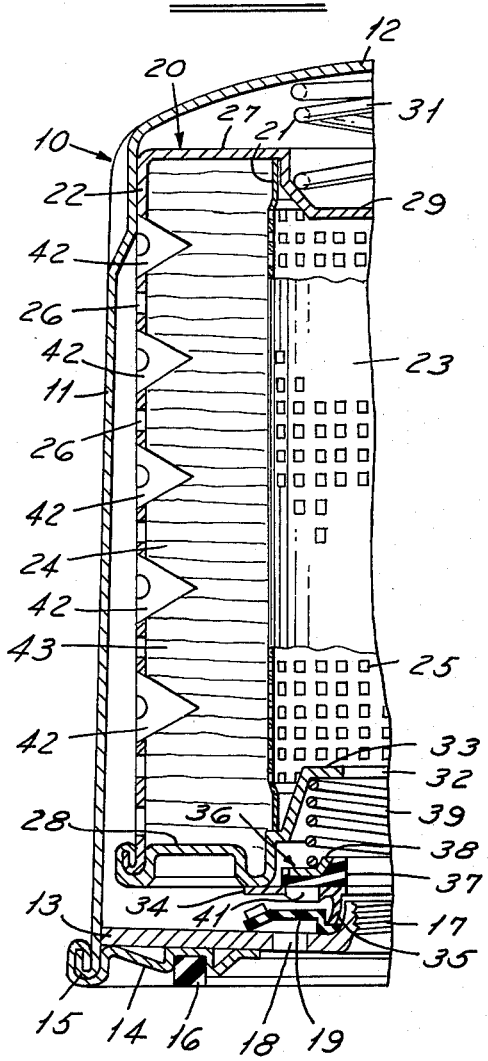
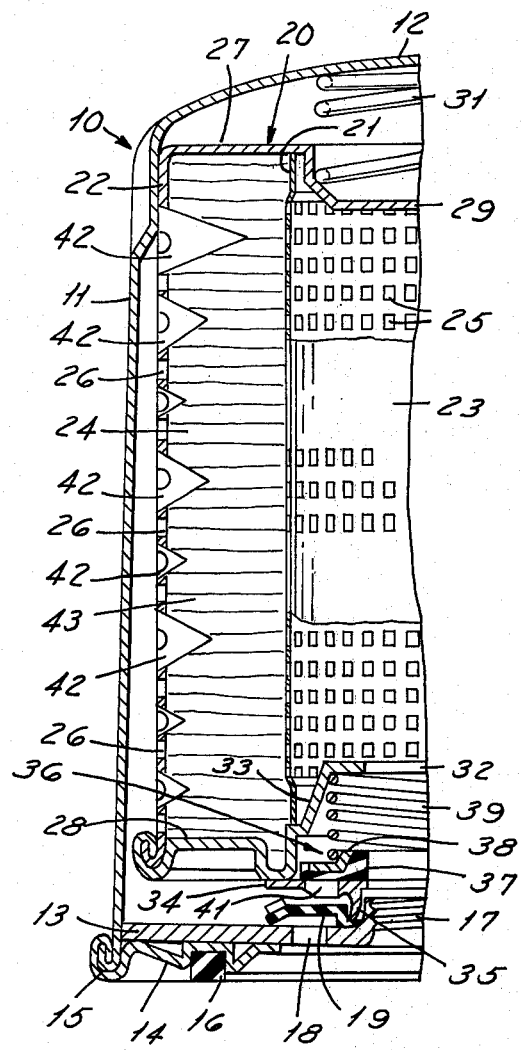

FLUID FILTER CARTRIDGE

BACKGROUND OF THE INVENTION

The present invention relates to depth-type oil filters particularly adapted for the filtration of motor vehicle engine oil. In the art of motor vehicle engine oil filtration, it has long been recognized that the flow characteristics of the oil to be filtered does not remain uniform. The variations in engine temperature affect the viscosity of the oil. Also, the dirt and dust particles that find their way into the lubrication system are not of uniform size. The flow rate of a depth-type filter having a filter media of uniform porosity varies with the viscosity and degree of contamination of the oil to be filtered. To compensate for these variables so that a substantially uniform flow rate is maintained through the filter, the prior art suggests that the filter be constructed and arranged to permit parallel, dual or multi-flow rates through the media.

As disclosed in U.S. Pat. No. 2,559,267, issued July 3, 1951 to C. A. Winslow et al. for "Filter" or U.S. Pat. No. 3,562,895 issued Feb. 16, 1971 to L. F. Neibergall et al for "A Method of Making Filter", this may be accomplished by axially stacking depth-type filter media in an oil filter cartridge to provide a dual flow automotive type oil filter. This may also be accomplished by arranging a uniform porosity filter media so that it permits two-path depth-type filtration by having the oil pass through different radial thicknesses of the filter media. Reference may be made to U.S. Pat. No. 3,468,425, issued Sept. 23, 1969 to A. H. Engstrom for a "Fluid Filter Element" for an example of this construction.

It is an object of the present invention to provide a simple filter construction of the depth-type in which the filter media is a uniform porosity material which is externally influenced to provide dual or multi-flow filtration.

SUMMARY OF THE INVENTION

A fluid filter cartridge in accordance with this invention has spaced inner and outer perforated walls forming concentric chambers. End plates cap the ends of the walls with one of the end plates being centrally apertured to provide a passageway in communication with the inner wall chamber. A filtering media, preferably of cotton and wood fibers, is packed in the chamber between the inner and outer walls.

The improvement comprises a plurality of surface deformations in one of the walls, preferably the outer wall, extending into the filtering media toward the other wall. The surface deformations engage and compress the filtering media contiguous thereto to provide filter flow paths from the one wall to the other of a higher density than that of the uncompressed filtering media.

DESCRIPTION OF THE DRAWINGS

Further features and advantages of the present invention will be made more apparent as this description proceeds, reference being had to the accompanying drawings, wherein:

FIG. 4 is a partial view in part similar to FIG. 1 illustrating a second embodiment of the present invention; and FIG. 5 is a view similar to FIG. 4 illustrating a third embodiment of the present invention.

DETAILED DESCRIPTION OF THE INVENTION

Figure 1:
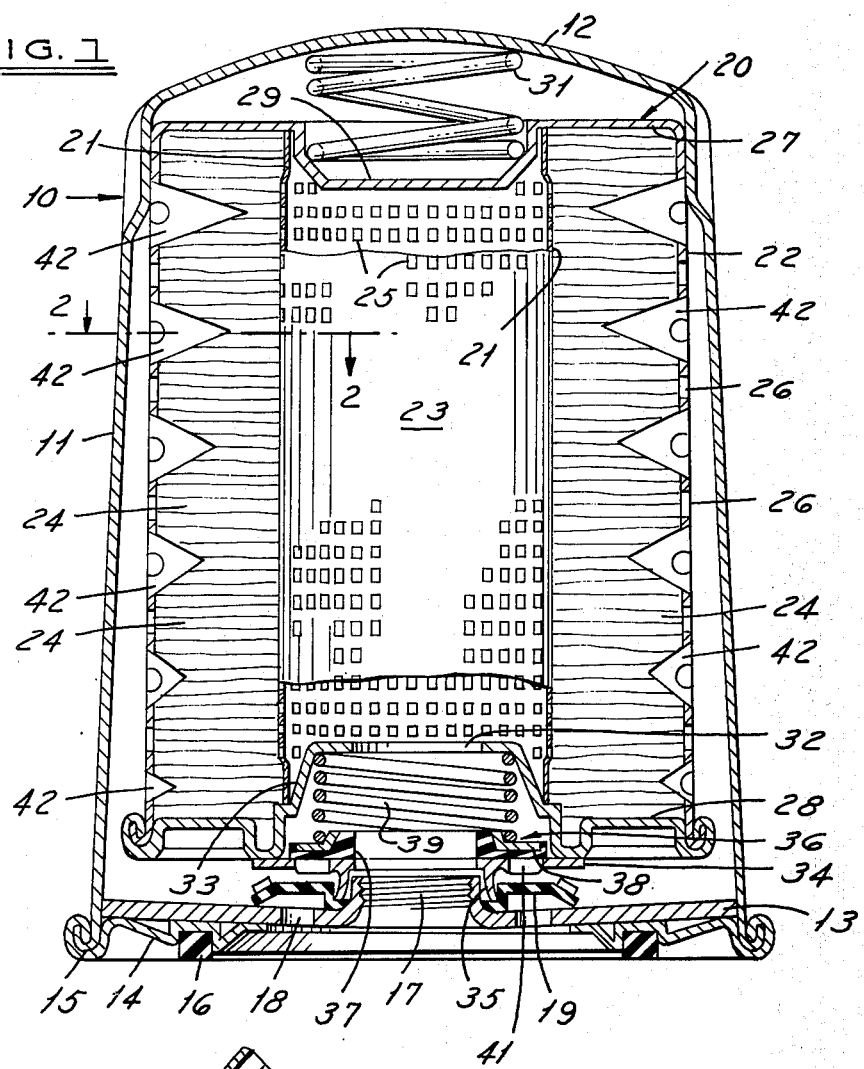
FIG. 1 is a view in part sectional of a disposable oil filter containing a cartridge packed with filter media in accordance with the present invention.

The present invention embodies a fluid or oil filter cartridge adapted to be nonremovably sealed within a disposable filter unit, generally designated 10. From external appearances, the filter unit 10 appears conventional in that it comprises a thin-wall cylindrical housing or cover assembly 11 closed at one end by an integral dome-shaped end wall 12. The opposite end of the housing 11 is closed by an annular mounting plate 13 which fits within the open end of the housing 11 and is held in place by a shell cap 14, and shell cap being spot-welded to the mounting plate 13 near its center and lock-seam 15 at its periphery to the lower end of the housing. The shell cap 14 is formed to receive an external sealing ring or gasket 16 adapted to sealingly engage a machined surface on the engine block.

The mounting plate 13 is formed with a screw-threaded boss 17 adapted to be threaded on a nipple (not shown) projecting from the vehicle engine block. The mounting plate is provided with a ring of oil inlet apertures covered by an internal annular flat valve 19 which functions as a conventional antidrain back valve.

Except as will be hereinafter described, the filter media cartridge or container, generally designated 20, embodying the present invention has many conventional features. The cartridge 20 has an inner perforated wall or center tube 21 and an outer perforated wall 22 spaced therefrom and forming concentric chambers 23 and 24. The perforations are indicated at 35 in the center tube 21 and at 26 in the outer wall 22. End plates 27 and 28 cap the respective ends of the inner and outer walls 21 and 22. The end plate 21 is adjacent the dome 12 of the housing 11 and has a central depression 29 which provides a seat for a cartridge positioning spring 31.

The end plate 29 has a central aperture 32 at the base of a centrally positioned, inwardly extending, boss or recess 33. The recess 33 is capped by an annular valve seat 34 having a depending collar portion 35 which fits over the mounting plate boss 17 to centrally locate the cartridge 20 within the housing 11. Abutting the inner face of the annular valve seat 34 is a bypass valve 36 comprising an annular gasket 37 bonded to a seal plate 38 which is spring loaded by a compression spring 39 in closed direction. The valve seat 34 has a series of circularly positioned apertures 41.

As hereinabove described, the oil filter unit 10 operates as any conventional oil filter of the cartridge type. With the housing 10 threadedly engaged by its threads 19 on the vehicle engine block nipple and with the gasket 16 seated against the engine block wall, the oil to be filtered flows through the apertures 18 in the annular mounting plate 13 into the chamber between the annular mounting plate 13 and the end plate 28 of the filter cartridge. The pressure of the oil from the oil pump causes the anti-drain back flap valve 19 to lift to permit this oil flow. The oil then flows between the housing wall 11 and the outer wall 22 of the cartridge 20 through the perforations in the latter through whatever filter media may be located between the outer wall 22 and the inner wall 21. From the inner wall 21 the flow is into the center chamber 23 of the cartridge, then through the end plate aperture 32 into the engine block nipple on which the mounting plate has been threaded. From the nipple in the engine block, the oil then travels through various passageways to the parts of the engine to be lubricated.

As in a conventional filter unit, if the filter media becomes clogges or if the rate of flow through the filter media is insufficient because of excess viscosity of the oil, the pressure of the oil in the chamber between the mounting plate 13 and the end cap or end plate 28 of the cartridge will build up and cause the bypass valve 36 to be lifted from the annular valve seat 34 so that the oil is able to bypass the filter media and flow directly into the aperture leading to the nipple on which the mounting plate has been threaded.

Figure 2:
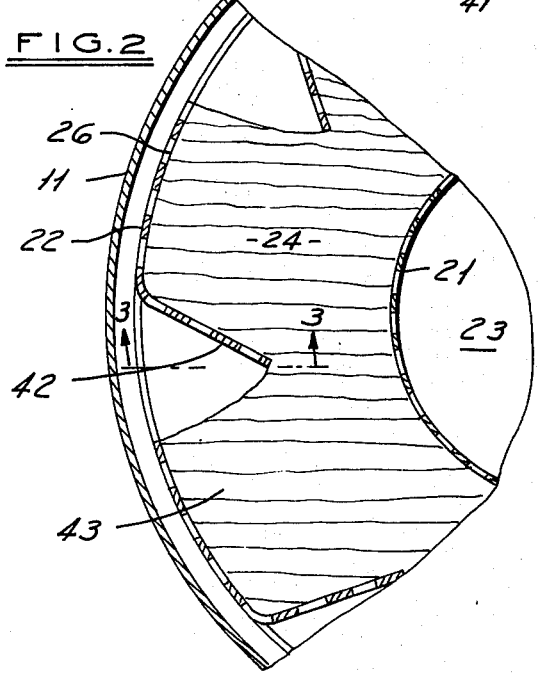
FIG. 2 is an enlarged sectional view on the line 2—2 of FIG. 1.
Figure 3:
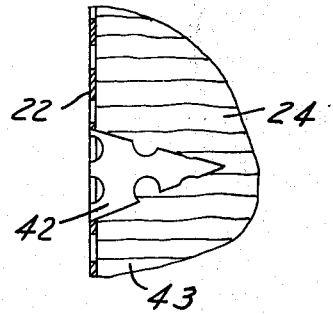
FIG. 3 is a view in the direction of the arrow 3 in FIG. 2.

In accordance with the present invention, the chamber 24 of the cartridge or container 20 is filled with filter media composed of cotton and wood fibers of substantially uniformed density. After the cartridge assembly is completed, the outer wall 22 is subjected to a plurality of inward surface deformations. The surface deformations are placed in the media container with the filter media in place. Preferably, the surface deformations comprise lanced projections 42 of substantially triangular shape. As best seen in FIG. 2, the triangular projections 42 extend inwardly at an angle to the wall surface 22 toward the inner wall 21. The triangular projections are arranged in axially spaced rows around the circumference of the cartridge 20.

In the embodiment of FIG. 1, the triangular projections 42 in each row are of equal size. The projections 42 are, however, of decreasing size beginning with the row nearest the end plate 27 and going toward the apertured end plate 28.

In the embodiment of FIG. 4, all of the projections 42 in the wall 22 are of the same size.

In the embodiment of FIG. 5, the projections 42 are of the same size in each axial row but are of random size in the rows from the end plate 27 toward the apertured end plate 28. As illustrated, the projections 42 in the row nearest the end plate 27 may be considered as being of a large size, the projections in the next row as being of an intermediate size, and the projections in the third row from the end plate 27 as being of a small size. The fourth row projections 42 are again of an intermediate size with the fifth row being of the small size. The sixth row of projections are again of an intermediate size. The last two rows toward the apertured end plate 28 are of a small size. This pattern could be varied as desired.

The concept of the inwardly lanced projections 42 achieves two end results. First, and of lesser importance, is that they function to stabilize the position of the cotton and wood fibers of the filter media 43 within the chamber 24. The latter, when under pressure of the oil flowing through the cartridge 20, compresses in a radial direction and thus becomes loose in the chamber 24. Under severe vehicle vibratory conditions, the filter media 43 then has a tendency to pack in an axial direction toward whichever end of the filter 10 may be in a down or substantially down position. The projections 42 resist this downward packing tendency.

Second, and of major importance to the present invention, the projections compress the filter media 43 contiguous thereto toward the inner wall 21. The amount of compression is dependent on the extent and the size of the triangular projections 42. Thus, the path the oil must take in flowing through the filter media 43 is a variable depending on the placement and size of the projections 42. Contiguous to the projections 42, the path is shorter and of higher density than the path between the projections.

In the FIG. 1 embodiment with the lance projections 42 in stepped depth, a multi-flow or poly-flow pattern is obtained. In the FIG. 4 embodiment with the lance projections of even depth, a dual flow pattern of high flow areas and low flow areas is obtained thus providing a dual filtering action. In the FIG. 5 embodiment with the variable or intermittent size projections, there is achieved a poly-flow feature.

Thus, with the use of a filter cartridge as embodied in the present invention, as the viscosity of the oil changes with changes in engine temperature and as the contaminant particles of various sizes are filtered out of the oil as the oil flows through the filter media, the filter 10 is able to function as a full flow filter.

Reference may be made to U.S. Pat. No. 2,559,267 cited earlier for a discussion of the manner in which a filter having a filtering media of variable density is able to accommodate variations in oil viscosity and variable sizes of contaminants.

It is to be understood this invention is not limited to the exact construction illustrated and described above, but that various changes and modifications may be made without departing from the spirit and scope of the invention as defined by the following claims.

I claim:
1. A fluid filter cartridge having spaced inner and outer perforated walls forming concentric chambers,
end plates capping the ends of the walls,
one of the end plates being centrally apertured to provide a passageway in communication with the inner wall chamber,
and a filtering media packing the chamber between the inner and outer walls,
wherein the improvement comprises:
a plurality of surface deformations in one of the walls extending into the filtering media toward the other wall,
the surface deformations engaging and compressing the filtering media contiguous thereto to provide filter flow paths through the compressed media of a higher density than that of the uncompressed media.
2. A fluid filter cartridge according to claim 1, in which:
the surface deformations extend into the filtering media to varying depths from the one wall surface.
3. A fluid filter cartridge according to claim 2, in which:
the surface deformation comprise lanced triangular-shaped projections extending inwardly from the outer wall.
4. A fluid filter cartridge according to claim 3, in which:
the filtering media comprises a cotton and wood fibers media of uniform density prior to being packed in the chamber between the inner and outer walls.
5. A fluid filter cartridge according to claim 1, in which:
the surface deformations comprise triangular projections inwardly lanced from the outer wall.

6. A fluid filter cartridge according to claim 5, in which:

the triangular projections are arranged in axially spaced rows.

7. A fluid filter cartridge according to claim 6, in which:

the triangular projections are of decreasing size beginning with the row farthest away from the apertured end plate.

8. A fluid filter cartridge according to claim 6, in which:

the triangular projections in each row are of equal size with the projections decreasing in size beginning with the row farthest away from the apertured end plate, 9. A fluid filter cartridge according to claim 6, in which:

the axial rows have triangular projections substantially equal in size within a respective row, the size of the projections in the respective rows being variable with respect to those in other rows.

10. A fluid filter cartridge according to claim 9, in which:

the filtering media comprises a cotton and wood media of uniform density prior to being packed in the chamber between the inner and outer walls, and the variable size projections compress the media to cause flow paths of variable density.

11. A fluid filter cartridge according to claim 5, in which:

the surface deformations in engagement with the filtering media stabilizes the latter against axial displacement relative to the chamber formed by the outer and inner walls.

* * * * *